US007572461B2

(12) United States Patent
Sawyer et al.

(10) Patent No.: US 7,572,461 B2
(45) Date of Patent: Aug. 11, 2009

(54) BORER-RESISTANT WOOD, WOOD PRODUCTS, AND WOODEN STRUCTURES AND METHODS

(75) Inventors: Kenneth I. Sawyer, 85 N. Middletown Rd., C3, Nanuet, NY (US) 10954; Robert J. Kupper, Warwick, RI (US)

(73) Assignee: Kenneth I. Sawyer, Nanuet, NY (US)

( * ) Notice: Subject to any disclaimer, the term of this patent is extended or adjusted under 35 U.S.C. 154(b) by 762 days.

(21) Appl. No.: 10/793,644

(22) Filed: Mar. 5, 2004

(65) Prior Publication Data

US 2005/0196419 A1 Sep. 8, 2005

(51) Int. Cl.
*A01N 25/10* (2006.01)

(52) U.S. Cl. ................. 424/411; 424/78.09; 424/78.19; 424/78.35; 424/78.37; 424/403; 424/407; 424/409; 424/412; 514/277; 514/318; 514/533; 514/535; 523/122

(58) Field of Classification Search ....................... None
See application file for complete search history.

(56) References Cited

U.S. PATENT DOCUMENTS 1,758,958 A 5/1930 McQuaid
3,018,269 A 1/1962 Bruno
3,817,940 A 6/1974 Blahak et al.
3,929,863 A 12/1975 Blahak et al.
3,932,360 A 1/1976 Cerankowski et al.
3,932,369 A 1/1976 Sartori et al.
4,007,239 A 2/1977 Blahak et al.
4,012,529 A 3/1977 Bultman et al.
4,051,279 A 9/1977 Peterson
4,098,955 A 7/1978 Partridge
4,154,818 A 5/1979 Kanada et al.
4,220,688 A 9/1980 Mitchell et al.
4,325,993 A 4/1982 Schroder
4,328,322 A 5/1982 Baron
4,504,468 A 3/1985 Brill et al.
4,720,535 A 1/1988 Schleier et al.
4,914,174 A 4/1990 Slack
4,983,072 A 1/1991 Bell, Jr.

(Continued)

FOREIGN PATENT DOCUMENTS

EP 0 527 568 A2 2/1993

(Continued)

OTHER PUBLICATIONS

Lin, Q., et al., "Synthesis and characterization of new Schiff-base coordination polymers," *Chem. Abstracts 129*:1084, American Chemical Society, Abstract No. 350165r (1998).

(Continued)

*Primary Examiner*—Neil Levy
(74) *Attorney, Agent, or Firm*—Sterne, Kessler, Goldstein & Fox PLLC

(57) ABSTRACT

The invention provides methods for suppressing the degradation of wood, wood products, and wooden structures due to infestation by wood-boring organisms, by use of a polyurea composition. The invention also provides for wood, wood products, and wood structures that are resistant to degradation due to borer infestation by use of a polyurea composition.

6 Claims, 4 Drawing Sheets

U.S. PATENT DOCUMENTS

| | | | | |
|---|---|---|---|---|
| 4,996,261 | A | 2/1991 | Lebovits et al. | |
| 5,087,661 | A | 2/1992 | Aoki et al. | |
| 5,162,481 | A | 11/1992 | Reid et al. | |
| 5,244,316 | A | 9/1993 | Wright et al. | |
| 5,380,484 | A | 1/1995 | Woods et al. | |
| 5,516,236 | A | 5/1996 | Williams et al. | |
| 5,829,920 | A | 11/1998 | Christenson | |
| 5,919,004 | A | 7/1999 | Christenson | |
| 6,033,150 | A | 3/2000 | Culen | |
| 6,297,320 | B1 | 10/2001 | Tang et al. | |
| 6,305,427 | B1 | 10/2001 | Priest, II | |
| 6,309,732 | B1 | 10/2001 | Lopez-Anido et al. | |
| 6,465,552 | B1 | 10/2002 | Chorvath et al. | |
| 6,552,155 | B1 | 4/2003 | Gutman et al. | |
| 7,008,997 | B2 * | 3/2006 | Kovacs | 524/770 |
| 2001/0036535 | A1 | 11/2001 | Lopez-Anido et al. | |

FOREIGN PATENT DOCUMENTS

| | | |
|---|---|---|
| GB | 1064841 | 4/1967 |
| WO | WO 00/64860 | 11/2000 |

OTHER PUBLICATIONS

Mark, H. F., et al., "Polyureas" in *Encyclopedia of Polymer Science and Engineering*, vol. 13, *Poly(phenylene Ether) to Radical Polymerization*, Mark H. F. et al., eds., John Wiley & Sons, Inc., New York, pp. 212-217 (1988).

Michael, A., et al., "Repair of wood piles with fiber reinforced composites," submission to Maine Sea Grant Program, pp. 1-3 (2001).

Micheal, A., "Repair of Wood Piles With Fiber Reinforced Composites," thesis abstract, date of defense 2002, available *at* http://www.library.umaine.edu/theses/theses.asp?Cmd=abstract &ID=CEE2002-004, accessed Jul. 22, 2004.

Smith, M. B. and March, J., "Hydrolysis of the Carbon-Nitrogen Double Bond" in *March's Advanced Organic Chemistry, Reactions, Mechanisms and Structure*, Fifth Edition, Smith, M.B. and March, J., eds., John Wiley & Sons, Inc., New York, p. 1177 (2001).

Textor, K., "Invasion of the Shipworms," *Down East* 33-34, Down East Enterprise, Inc. (2001).

"Applying Kenways' technology to prevent shipworm attacks," in *Maine Science and Technology Foundation* (2002), found *at* http://www.mainescience.org/success/2002/01c_mep.html, accessed Aug. 9, 2002.

"Composite Material a Hopeful Sign in Fight Against Shipworms," in *Sea Grant News: Shipworms, Ozone & Hurricanes* (2002), found *at* http://www.newswise.com/articles/2002/4/TIPS0152.SGP.html, accessed Aug. 9, 2002.

"Composite Materials a Hopeful Sign in Fight Against Shipworms," in *Tip Sheets Apr. 2002*, pp. 3-4, found *at* http://www.seagrantnews.org/news/tips/tip_2002_april.html, accessed Aug. 9, 2002.

"Composites Technology Could Protect Piers From Shipworms," in *Maine Sea Grant* (2001), found *at* http://www.seagrant.umaine.edu/Hotopics/projects/shipworms.htm, accessed Jul. 23, 2002.

"New Composites Technology Being Developed to Protect Wood Piers from Shipworm Damage," in *Science and Engineering News from the University of Maine* (2001), found *at* http://www.umaine.edu/mainesci/Archives/CivilEnvironmentalEng/Shipworm.htm, accessed Jul. 23, 2002.

"Pier Wrapping To Guard Against Shipworm," in *the Lobster Bulletin*, p. 6 (2001), found *at* http://inferno.asap.um.maine.edu/lobster/library/publications/bulletin/summer2001.htm, accessed Aug. 9, 2002.

"Repair of Wood Piles with Fiber-Reinforced Composites," in *Maine Sea Grant, Research Projects Funded in 2002*, p. 4, found *at* http://www.seagrant.umaine.edu/Research/research.html, accessed Aug. 19, 2002.

"Repair of Wood Piles with Fiber-Reinforced Composites," Sea Grant Application No.: R/CE-239, in the record of National Oceanic and Atmospheric Administration, U.S. Dept. of Commerce, application code:2301, initiation date:Feb. 1, 2000, completion date:Jan. 31, 2002., pp. 1-6, 30-31, and 197-218.

"UMaine Working to Reduce Cost of Repairing Shipworm Damage to Marine Pilings," in *Research Snapshots*, found *at* http://www.umaine.edu/research/RSMarinePilings.htm, accessed Aug. 9, 2002.

Patent Abstracts of Japan, English language abstract of JP 07-025976, (1995).

* cited by examiner

BORER-RESISTANT WOOD, WOOD PRODUCTS, AND WOODEN STRUCTURES AND METHODS

FIELD OF THE INVENTION

The invention relates the suppression of degradation of wood, wood products, or wood structures due to infestation by wood-borers.

BACKGROUND OF THE INVENTION

Wood, wood products, and wooden structures are vulnerable to degradation by wood-boring organisms. For example, wood boring-insects, such as termites, carpenter ants, and wood-boring bees (e.g. carpenter bees) cause considerable damage to buildings, fence posts, utility poles, and wooden supports.

Termites, particularly subterranean termites, are soil dwellers that exist in large colonies of several million termites. Members of the colony forage for cellulose-containing food items in the earth or above ground by building a system of closed mud tunnels to traverse from the ground to the above-ground food source. The ability of termites to cause considerable damage is in part due to the fact that they are not typically seen until termite infestation is at a relatively advanced stage, or that they cause damage to the interior of wooden structures or otherwise in places that are not readily observable.

Carpenter ants cause structural damage to wood, wood products, and wooden structures, such as homes, telephone poles, and trees by tunneling into the wood. Carpenter ants damage wood by hollowing it out for nesting, excavating galleries which have a smooth, sandpapered appearance. Wood that has been damaged by carpenter ants contains no mud-like material, as is the case with termites. Shredded fragments of wood, similar in appearance to coarse sawdust, are ejected from the galleries through preexisting cracks or slits made by the ants.

Wood-boring bees, such as carpenter bees, cause damage to wooden structures by boring into timbers and siding to prepare nests. Carpenter bee nests weaken structural wood and leave unsightly holes and stains on building surfaces.

Traditional methods for controlling wood-boring insects have included the application of insecticides and baiting systems. However, the effectiveness of such treatments has varied, and such treatment may introduce deleterious agents into the environment.

The use of wooden structures in the marine environment, such as piles or piers as structural supports for wharfs, bridges and other marine environment structures is well known. In particular, wooden pilings have been used for many years to support piers, wharfs, boat slips, and in some instances older bridges.

It is well known that such pilings are subject to many hazards necessitating repair or replacement. One major source of damage which drastically shortens the life expectancy of wood piling is attack by certain marine parasites and microorganisms which feed upon the cellulose material of the wood piling.

Particular marine microorganisms known to attack wooden pilings include limnoria and teredo microorganisms. The teredo, also known as shipworm, are marine, bivalve mollusks, typically on the order of 10 inches in length or less, although they have been known to grow to as much as 2 feet or more in length and have diameters of half an inch. The shipworm begins life as a larva and begins its metamorphosis into an adult when it has attached itself to the surface of a piece of submerged timber.

It is believed that the shipworm begins burrowing into the submerged timber and its tail appendage seals off the entry way. The shell valves of shipworms take the form of two small anterior members with file-like ribs, which are specialized for boring. By means of alternating contractions of the muscles that actuate the valves, the file-like ribs produce a cutting action that enable shipworms to bore into the wood they infest. Thereafter, they consume the structure by digesting the cellulose of the wooden members. In its boring, a shipworm will dispose of waste through an exhalation syphon and an inhalation syphon is designed to produce continuously circulating water over the shipworm's gills for the absorption of oxygen. New larvae are also disposed of through the exhalation syphon to infest the same submerged timber or other timber.

Typically, the only visible presence of a shipworm is the occurrence of two microscopic syphon tubes, one for the inhalation of fresh water and the other for exhalation. The specific danger with the shipworm is that the submerged timber pile appears to be secure and intact, when in fact, the interior of the pile may contain a great deal of infestation, thus weakening the pile.

A second marine borer, of the limnoria species, also referred to as a gribble, resembles lice and is about 5 mm (0.2 in) long. Gribbles live on submerged wood; for example, piers, bridge piles, and ship hulls and are capable of boring holes of approximately 3 mm in diameter. Gribbles destroy the structures they infest by burrowing at close intervals into the members that make up the structure and consuming the wood from which they are made.

Limnoria rarely penetrate the timber for more than 10 to 12 millimeters, but they normally infest in great numbers on the outer layer of the submerged timber such that the submerged timber takes on a honeycombed appearance with tiny individual channels. This attack, combined with the eroding effects of the sea's tide, breaks down the surface of the wood and exposes new surfaces for attack.

Previous efforts to safeguard wood-containing structures from marine microorganisms have included impregnating the structures and/or coating their surfaces with materials such as creosote. The use of poisonous, chemical agents, however, is of limited effectiveness and has associated negative side effects. For example, many jurisdictions have effectively banned the use of creosote in coastal waters.

As a second approach to avoiding the effects of mariner borer attack, workers seeking to control them have found they can be killed by suffocation. Specifically, biologists have noted that gribbles and shipworms rely on contact with sea water to get the oxygen they require for survival. Accordingly, marine engineers have proposed ways for interrupting the supply of sea water to the structural members borers infest. However, the effectiveness of such measures has varied.

Thus, there is a continuing need for an improved approach for protecting wood, wood products, and wooden structures from borer infestation, particularly in a way that is environmentally friendly.

SUMMARY OF THE INVENTION

In an embodiment, the invention provides a method of suppressing degradation of wood, wood products, or wooden structures by borer infestation. The method comprises applying a polyurea composition, more preferably a one-part polyurea composition to the wood, wood product, or wooden structure in an amount effective to suppress degradation by a wood borer. The invention also encompasses a borer-resistant wood, wood product, or wooden structure having a polyurea composition, preferably a one-part polyurea composition applied thereto in an amount effective to suppress degradation by a wood borer.

Another embodiment of the invention provides for a method of suppressing degradation of a wooden structure, such as a wood marine piling, by borer infestation. The method comprises forming a protective member around the piling, which suppresses degradation of the piling by borer infestation. The protective member comprises a fiber-reinforced polymer composite surrounding the piling and defining an annular space between the composite and the piling. A grouting material is added to the annular space. The fiber-reinforced polymer composite comprises a fiber-reinforcement material and a resin material including a polyurea composition, preferably a one-part polyurea composition.

The invention also encompasses a borer-resistant wooden structure, such as a marine piling apparatus. The structure comprises a wood marine piling and a protective member surrounding the piling which suppresses degradation of the piling by borers. The protective member comprises a fiber-reinforced polymer composite containing a fiber-reinforcement material and a resin material including a polyurea composition, preferably a one-part polyurea composition. An annular space is defined between the composite and the piling, and a grouting material fills at least a portion of the annular space.

In the inventive methods and the wood, wood products, and wooden structures of the invention, the one-part polyurea composition can be a composition comprising (a) one or more compounds having Formula I:

I

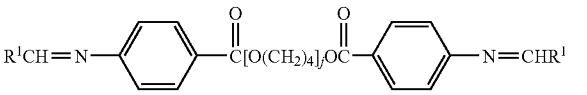

wherein j is an integer of 3 to 30 and $R^1$ is an unsubstituted homocyclic or heterocyclic aryl radical or alkyl, alkoxy, alkylthio or halogen substituted homocyclic or heterocyclic aryl radical; (b) an aromatic polyisocyanate, a polyurethane/urea prepolymer having aromatic isocyanate groups, or a combination thereof; and (c) a protic acid or a salt thereof.

Wood, wood products, or wooden structures in accordance with the present invention resist degradation due to borer infestation without the need for insecticides or bait which can potentially be harmful to the environment. Secondary dry rot, water damage and fungal damage are also inhibited.

DETAILED DESCRIPTION OF THE INVENTION

Figure 1:
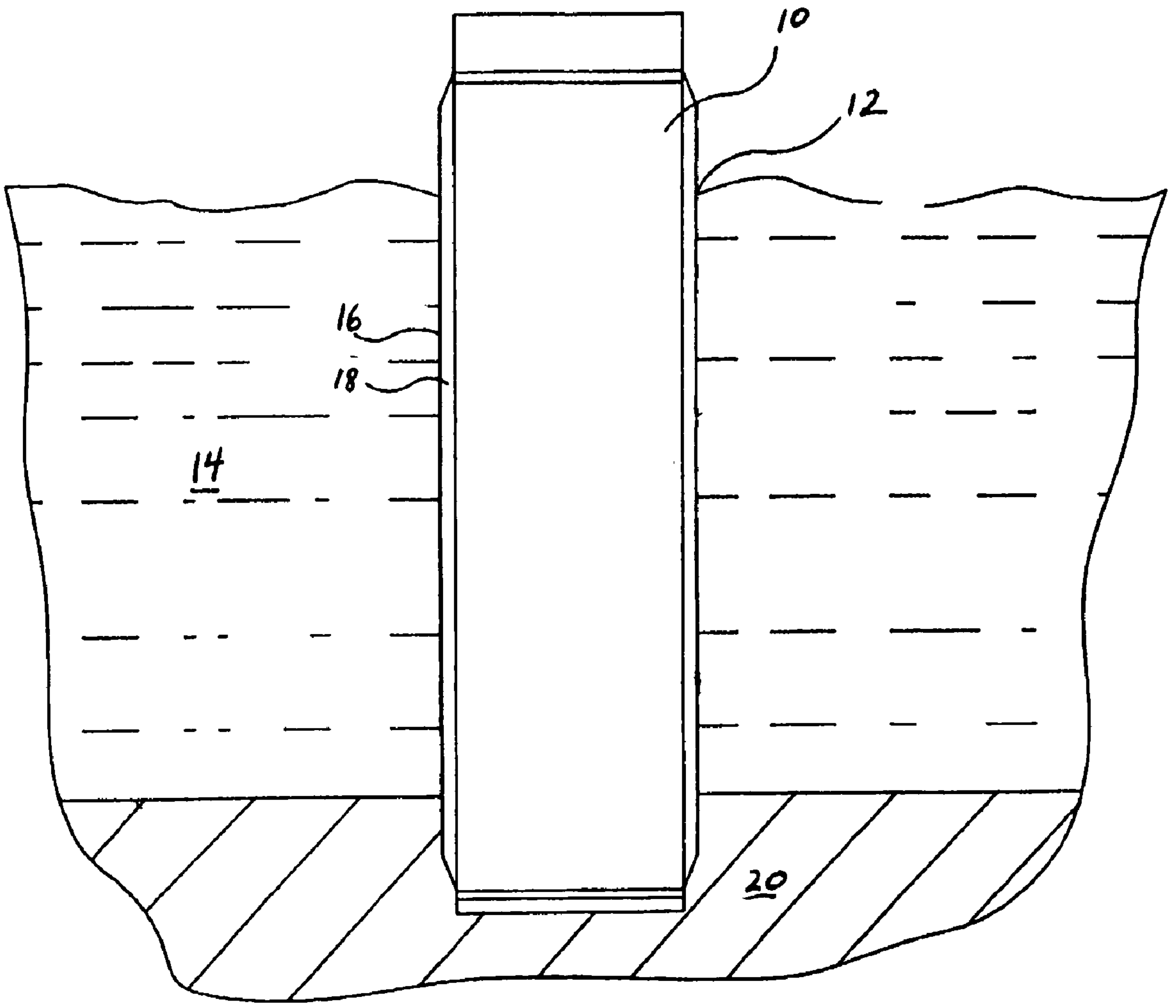
FIG. 1 is a side cross-section view of a submerged wood piling apparatus illustrating a protective member.

The invention provides novel methods and structures for suppressing degradation of wood, wood products, or wooden structures from degradation by wood-borers, including insect borers and marine borers. In various embodiments of the invention, the degradation of wood, wood products, or wooden structures due to borer infestation can be suppressed through the use of a polyurea composition.

The terms “wood”, “wood products”, and “wooden structure”, as used herein, are intended to have their ordinary meaning as ascribed to by persons of ordinary skill in the art. Illustratively, the term “wood” may include lumber, “wood products” may include materials made at least partially from wood or cellulose fiber, and “wooden structure” may include building, posts, shelters and the like made at least partially from wood or a wood product. Wood used in accordance with the present invention can be optionally pretreated with one or more preservative, including by pressure treatment.

In an embodiment of the invention, the wood products or wooden structures may include those with marine applications, such as pilings, support piers, wharfs, boat slips, bridges, ships, locks, and bank stabilizers. More specifically, the wooden structure may be a wood piling used as a support member in the marine environment.

The terms “wood borer” and “wood-boring” refer to organisms that can infest wood and cause the degradation of the appearance and/or structural integrity of wood, wood products, or wooden structures. Wood borers include, but are not limited to, wood-boring insects such as termites, carpenter ants, wood-boring bees (e.g. carpenter bees), and wood boring beetles, as well as marine wood borers such as shipworms and gribbles. The terms “borer” and “wood borer” are intended to be used interchangeably in the present application.

The term “polyurea composition” encompasses compositions that are derived from the reaction product of an isocyanate component and a resin blend component containing amine-terminated polymer resins and/or amine-terminated chain extenders.

Generally, in polyurea compositions, the isocyanate can be aromatic or aliphatic in nature. The isocyanate can be monomer, polymer, or any variant reaction of isocyanates, quasi-prepolymer or a prepolymer. The prepolymer, or quasi-prepolymer, can be made of an amine-terminated polymer resin, or a hydroxyl-terminated polymer resin.

The resin blend component may contain amine-terminated polymer resins and/or amine-terminated chain extenders. Typically, the amine-terminated polymer resins will not have any intentional hydroxyl moieties. The resin blend may also contain additives, or non-primary components. These additives may contain hydroxyls, such as pre-dispersed pigments in a polyol carrier. Typically, the resin blend does not contain any catalyst.

The polyurea composition utilized in the methods and structures of the present invention is not particularly limited. However, in preferred embodiments of the invention, the polyurea composition utilized is a “one-part” polyurea composition. By “one-part” polyurea composition, it is meant that the polyurea may be cured by atmospheric moisture after application.

In contrast to “two-part” or two-component polyurea resins, a one-part composition does not require that separate components, such as organic polyisocyanate or modified or blocked polyisocyanate and polyamine and/or polyol be mixed at the time of application on site to effect curing.

Rather, a one-part polyurea composition is pre-mixed and is storage stable in sealed containers, and can be cured merely by exposure to moisture.

More preferably, the polyurea composition utilized in the methods and structures of the present invention comprises N-protected poly(1,4-butanediol)bis(4-aminobenzoate) and organic polyisocyanate which can be rapidly cured by atmospheric moisture after application.

In embodiments of the invention, the one-part polyurea can be a composition comprising: (a) one or more compounds of Formula I:

I

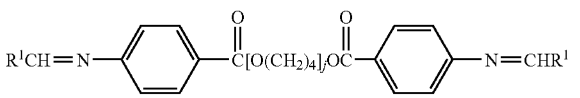

wherein j is an integer of 3 to 30 and $R^1$ is an unsubstituted homocyclic or heterocyclic aryl radical or alkyl, alkoxy, alkylthio or halogen substituted homocyclic or heterocyclic aryl radical; (b) an aromatic polyisocyanate, a polyurethane/urea prepolymer having terminal aromatic isocyanate groups, or a combination thereof; and (c) a protic acid or a salt thereof.

More particularly, substituent $R^1$ can be phenyl, methoxyphenyl, ethoxyphenyl, butoxyphenyl, hexyloxyphenyl, octyloxyphenyl, decyloxyphenyl, dodecyloxyphenyl, hexadecytoxyphenyl, ethylphenyl, isopropylphenyl, dimethylphenyl, furyl, pyridyl, or mixtures thereof. Preferably, $R^1$ is a 4-substituted phenyl such as 4-methoxyphenyl. Also in formula I, substitutent "j" preferably ranges from 12 to 16.

In preferred embodiments of the invention, the one-part polyurea composition contains about 75 to about 95% by weight of one or more compounds of Formula I; about 5 to about 25% by weight of an aromatic polyisocyanate, a polyurethane/urea prepolymer having terminal aromatic isocyanate groups, or a combination thereof; and about 0.05 to about 5% by weight of a protic acid or a salt thereof.

The one-part polyurea composition described above can be prepared according to the methods described in PCT Publication No. WO 00/64860 and U.S. Pat. No. 6,552,155, both incorporated by reference herein in their entireties.

For example, the polyaldimine compound (Formula I) can be prepared by reacting a poly(1,4-butanediol) bis(4-aminobenzoate), as shown in Formula II:

II

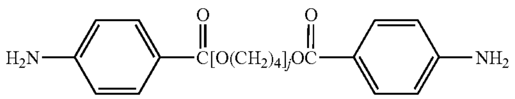

wherein j is an integer of 3 to 30; with a substantially equivalent amount of an aromatic aldehyde represented by the Formula III:

$R^1CH{=}O$ III wherein $R^1$ is an unsubstituted homocyclic or heterocyclic aryl radical or alkyl, alkoxy, alkylthio or halogen substituted homocyclic or heterocyclic aryl radical.

In an embodiment of the invention, the aldehyde may be chosen from benzaldehyde, anisaldehyde, furfural, ethoxybenzaldehyde, butoxybenzaldehyde, hexyloxybenzaldehyde, octyloxybenzaldehyde, decyloxybenzaldehyde, dodecyloxybenzaldehyde, hexadecyloxybenzaldehyde, ethylbenzaldehyde, isopropylbenzaldehyde, dimethylbenzaldehyde, furfural, pyridinecarboxaldehyde, and mixtures thereof.

Specifically, the compound represented by Formula I may be formed by heating poly(1,4-butanediol) bis(4-aminobenzoate) with two or more moles of aldehyde to allow dehydration reaction. The water generated in the reaction may be distilled out azeotropically or absorbed by molecular sieves or reacted with a water sponge, such as, e.g., organic mono- or polyisocyanate.

These reactions may be carried out with or without solvent. Suitable solvents include toluene, xylene, cyclohexane or heptane. After completion of the reaction, the solvent may be distilled from the reaction mixture to obtain the desired polyaldimine compound of Formula I.

A one-part polyurea composition for use in the present invention can be prepared by mixing under reduced pressure or in an inert atmosphere one or more compounds of Formula I with aromatic polyisocyanates, polyurethane/urea prepolymers having terminal aromatic isocyanate groups, or a combination thereof; and a protic acid or a salt thereof.

In forming the polyurea composition, the aromatic polyisocyanate can be an aromatic diisocyanate, carbodiimide modified polyisocyanate, biuret modified polyisocyanate, isocyanurate modified polyisocyanate, urethane modified polyisocyanate, or mixtures thereof. In an embodiment, the aromatic diisocyanates are toluene diisocyanates or diphenylmethane diisocyanates including various mixtures of isomers thereof, such as ISONATE 143L, and ISONATE 125M, both available from Dow Chemical Co., Midland, Mich., USA.

ISONATE 125M, which is an MDI mixture of approximately 98% 4,4'-diphenylmethane diisocyanate and 2% 2,4'-diphenylmethane diisocyanate is particularly preferred for use in the present invention due to its relatively high purity level. Use of the ISONATE 125 M provides for easier formulation, better storage quality, more consistent cure rate and viscosity, and a tougher resulting polyurea composition as compared to the use of ISONATE 143L.

A polyurethane prepolymer having terminal aromatic isocyanate groups can be prepared by reacting an excess of aromatic polyisocyanate with polyol or polyamine, so that two or more free isocyanate groups remain in the resulting prepolymer.

The ratio of the number of amino groups in the polyamine formed by the hydrolysis of polyaldimine to the number of isocyanate groups contained in the polyisocyanate and/or the polyurethane/urea prepolymer having terminal aromatic isocyanate groups can be 0.5 to 2.0, e.g., 0.7 to 1.5.

Suitable protic acids for use in the polyurea composition include carboxylic, sulfonic or phosphoric acids. Suitable carboxylic acids include aromatic carboxylic acids, while examples of sulfonic acids are aromatic aliphatic sulfonic acids. In an embodiment, the amount of the protic acids can be in the range of from about 0.05 to about 5% by weight of the composition.

In order to control viscosity, resin properties, and service life, auxiliary agents and/or additives such as fillers, thixotropic agents, plasticizers, adhesion improvers, metallic powders, inorganic or organic colorants, stabilizers, biocides and solvents can be incorporated into the polyurea composition.

Examples of suitable fillers include calcium carbonate, talc, kaolin, aluminum sulfate, zeolite, diatomaceous earth, ground coconut shell, other natural products, polyvinylchloride paste resin, fumed silica, glass balloon and polyvinylidene chloride resin balloon. Examples of suitable thixotropic agents include colloidal silica, fatty acid amide wax, aluminum stearate, surface treated bentonite, polyethylene short fiber, Kevlar short fibers and phenol resin short fiber. Examples of suitable plasticizers include dioctyl phthalate, dibutyl phthalate, dilauryl phthalate, butyl benzyl phthalate, dioctyl adipate, diisodecyl adipate, diisodecyl phthalate and trioctyl phosphate. Illustrative adhesion improvers include known silane coupling agents.

Examples of metallic powder include metal flakes such as aluminum flakes, nickel flakes, stainless steel flakes, titanium flakes and bronze flakes. One type of metallic powder can be used individually, or a combination of two or more types can be used. The metallic powder can be blended in the range of preferably from about 0.1 to about 20% by weight of the composition.

Examples of inorganic colorants include carbon black, graphite, molybdenum disulfide, titanium oxide, chromium oxide, iron oxide based colored pigments such as iron oxide red; and complex metal oxide based colored pigments such as composite inorganic oxide yellow and baked pigment.

Examples of organic colorants include phthalocyanine based colored pigments such as phthalocyanine green and phthalocyanine blue; perylene based colored pigments such as perylene red and perylene maroon; indanthrone based colored pigments such as indanthrone blue; azomethine based colored pigments such as azomethine yellow; benzimidazolone based colored pigments such as benzimidazolone yellow and benzimidazolone orange; quinacridone based colored pigments such as quinacridone orange, red, violet and quinacridone magenta; anthraquinone based colored pigments such as anthraquinone yellow and red; diketopyrolopyrrole based colored pigments such as diketopyrolopyrrole orange and red; isoindolinone based colored pigments such as isoindolinone yellow and orange; phthalimide based colored pigments such as phthalimide yellow; and dioxazine based colored pigments such as dioxazine violet.

Colorants can be blended in the range of from about 0.1 to about 5% by weight of the composition. One type of colorant can be used individually, or a combination of two or more types can be used.

Sterically hindered amines, phenol compounds, triazol compounds, organic sulfides, benzoxazoles, diphenyloxazole and other stabilizers can be added in the range of from about 0.1 to about 2% by weight of the composition. Examples of suitable phenol and triazole compounds are illustrated in U.S. Pat. Nos. 3,018,269 and 6,465,552, the patents incorporated by reference herein. Diphenyloxazoles are particularly useful as UV stabilizers.

When the additives have high moisture content, these additives must previously be dehydrated.

In one embodiment, the present invention provides for a borer-resistant wood, wood product, or wooden structure. The wood, wood product, or wooden structure has a polyurea composition applied thereto in an amount effective to suppress degradation of the piling by a wood borer.

The present invention also provides a method of suppressing degradation of wood, wood products, or wooden structures by borer infestation. The method comprises applying a polyurea composition to wood, a wood product, or a wooden structure in an amount effective to suppress degradation by a wood borer.

In the method and wood, wood product, or wooden structure, the polyurea composition applied can be the one-part polyurea composition comprising (a) one or more compounds of Formula I:

I

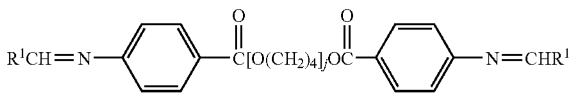

wherein j is an integer of 3 to 30 and $R^1$ is an unsubstituted homocyclic or heterocyclic aryl radical or alkyl, alkoxy, alkylthio or halogen substituted homocyclic or heterocyclic aryl radical; (b) an aromatic polyisocyanate, a polyurethane/urea prepolymer having terminal aromatic isocyanate groups, or a combination thereof; and (c) a protic acid or a salt thereof, as discussed above.

The polyurea composition is applied to the wood, wood product, or wooden structure in an amount effective to suppress degradation by a wood borer. By the term "an amount effective to suppress degradation" by a wood borer, it is meant that the polyurea composition is applied so that the wood, wood product, or wooden structure resists degradation by wood borer infestation, including, but not limited to infestation by wood-boring insects such as termites, carpenter ants, and wood-boring bees, or marine borers such as shipworms and gribbles. The term refers to suppressing degradation of uninfested wood, wood products, or wooden structures, as well as resisting further degradation of those which have already been infested and/or suffered degradation due to borer infestation.

The polyurea composition can be applied to the wood, wood product, or wooden structure in any suitable manner. For example, the composition can be applied by brushing, spraying, soaking, or by any of the well-known pressure or thermal methods commonly employed with wood preservatives. In one embodiment of the invention, the polyurea composition is applied by brushing the composition onto the outer surfaces of the wood, wood product, or wooden structure. Alternatively, the wood, wood product, or wooden structure can be soaked with the polyurea composition.

The polyurea composition can be diluted in a solvent directly prior to use. In embodiments of the invention, inclusion of a solvent lowers the viscosity of the formulation and allows for better flow and penetration of the polyurea composition into the wood, wood product, or wooden structure. The solvent that can be used is not particularly limited, so long as it does not react with the polyurea composition. Suitable solvents include acetone, tetrahydrofuran, and 2-butanone.

The polyurea composition can be applied to any surface of wood, wood products or wooden structures that are capable of infestation by wood borers and/or exposed to water or air.

In an embodiment of the invention, when the wooden structure is a wood marine piling, the polyurea composition can be applied to all surfaces of the piling exposed to water and or air. Alternatively, the polyurea composition can be applied to the surfaces of the piling up to, and optionally above, the high tide line mark of the piling in the marine environment. The polyurea composition can also be applied to other surfaces of the piling not directly in contact with sea water, such as all or part of the portion of the piling that is or to be driven into the sea floor.

For a marine structure such as a marine piling, the polyurea composition can be applied to an uninstalled piling, or to a marine piling that is already submerged in sea water. In instances where the marine structure, such as a piling, is already submerged, the polyurea composition may be applied by isolating a section of the piling to be treated from the water, applying the polyurea composition, and allowing the composition to cure.

When applied to wood, wood products, or wooden structures, the polyurea composition, and more particularly the one-part polyurea composition described above, cures and provides protection against degradation due to borer infestation. When applied to wood, wood products, or wooden structures already infested with wood borers, further degradation can be suppressed upon application of the polyurea composition.

Although not wanting to be bound by theory, it is believed when the polyurea composition, particularly a one-part polyurea as described above, is applied to uninfested wood, wood products, or wooden structures, such treated surfaces are not recognized by wood borers as a wood source. It is also believed that when the polyurea composition is applied to wood, wood products, or wooden structures already subjected to borer infestation, that the polyurea composition limits further degradation by cutting off the oxygen supply of the borers present.

Another embodiment of the invention relates to a borer-resistant marine structure, such as a borer-resistant marine piling apparatus. The marine piling apparatus comprises a wood marine piling, a fabric in contact with the piling, and a polyurea composition. The polyurea composition is impregnated in the fabric and is present in an amount effective to suppress borer infestation of the piling. In embodiments of the invention, the polyurea composition is bonded to the fabric and to the piling.

The invention also includes another method of suppressing degradation of a wooden structure, such as a marine piling, by marine borers. The method comprises contacting a wood marine piling with a fabric and applying a polyurea composition to the fabric in an amount effective to suppress degradation of the piling by a marine borer.

The fabric may be contacted with the structure in any suitable manner. For example, in embodiments utilizing a piling, the fabric can surround and be attached to the piling. For example, the fabric can be wrapped around and attached to the surface of the piling in various ways, such as by nailing or stapling. The fabric may fit tightly around the protected structure. Alternatively, the fabric can be loosely fitting or hanging, so long as in combination with the polyurea composition forms a surrounding barrier to suppress degradation of the structure due to marine borer infestation.

The type of fabric that can be contacted with the marine structure is not particularly limited, provided that the fabric is relatively sea-water resistant, either alone or when in combination with the applied polyurea composition.

The fabrics used in the present invention are inherently or can treated to be relatively chemically stable in sea water and are resistant to attack by marine organisms. The fabric can be natural or synthetic organic or inorganic fibers, and can include woven or non-woven materials. Suitable fabrics for use in the present invention include, but are not limited to, Kevlar®, Dynel, nylon, carbon fiber, and fiberglass.

The polyurea composition may be applied to the fabric in any suitable manner. For example, the composition can be applied to the fabric by brushing, spraying, or soaking. Typically, the polyurea composition is applied so as to saturate the fabric, and the composition cures while in contact with the fabric.

The polyurea composition can be applied to the fabric prior to, during, or after the fabric is contacted with the marine structure. In an embodiment of the invention, the polyurea composition is applied to the fabric, and the fabric is contacted with the structure so as to allow the polyurea composition to cure and bond to both the fabric and to the structure.

The fabric and polyurea composition can be applied directly to new marine structures, such as pilings, or to marine structures that are already submerged in sea water. In instances where a piling is already submerged, the fabric and polyurea composition can be applied by isolating a section of the piling to be treated from the sea water, applying the fabric and the polyurea composition, and allowing the composition to cure.

In embodiments of the invention where a fabric and a polyurea composition are applied to wood marine pilings, the fabric can be attached and the polyurea composition can be applied to various surfaces of the piling. For example, the fabric and polyurea composition can be applied to all surfaces of the piling exposed to water and/or air. Alternatively, the fabric and polyurea composition can be applied to the surfaces of the piling up to, and optionally above, the high tide line mark of the piling in the marine environment. The fabric and polyurea composition can also be applied to other surfaces of the piling not directly in contact with sea water, such as, for example, all or part of the portion of the piling that is or to be driven into the sea floor.

When applied to the piling, the fabric and the polyurea composition, more particularly the one-part polyurea composition described above, suppresses degradation due to marine borer infestation, or suppresses further degradation of pilings already subjected to infestation.

Another embodiment of the invention relates to a borer-resistant structure, particularly a borer-resistant marine piling apparatus. The apparatus comprises a wood marine piling and a protective member surrounding the piling which suppresses degradation of the piling. The protective member comprises a fiber-reinforced polymer composite which surrounds the piling and defines an annular space between the composite and the piling. A grouting material fills at least a portion of the annular space between the composite and the piling.

In conjunction with the structure, another embodiment of the invention provides for a method of suppressing degradation of a wood-containing marine structure, such as a piling, by borer infestation. The method comprises forming a protective member around the piling which suppresses degradation of the piling by borer infestation. In the method, the protective member comprises a fiber-reinforced polymer composite surrounding the piling, defining an annular space between the composite and the piling, and a grouting material in the annular space.

The fiber-reinforced polymer composite used in the protective member comprises a fiber-reinforcement material and a resin material. The fiber-reinforcement material that may be used is not particularly limited, and may include carbon fiber steel mesh, stainless steel mesh, titanium mesh, Kevlar® mesh, Dynel mesh, nylon mesh and fiberglass mesh. In an embodiment of the invention, the fiber-reinforcement material can be a woven fabric and/or a chopped strand mat.

The resin material that may be used in conjunction with the fiber-reinforcement material to form the fiber-reinforced polymer composite includes a polyurea composition. More specifically, the polyurea composition may be a one-part polyurea composition, including the composition described above. The resin material may additionally include other materials such as, for example, an epoxy-based vinyl ester, polyvinyl acetate, polysaccharide, or modified polysaccharide.

The fiber-reinforced polymer composite can be prepared by any suitable method. For example, the fiber-reinforcement material can be impregnated with a resin material, such as a polyurea composition, or more specifically a one-part polyurea composition. The impregnated material can be placed on a mold. Excess resin can be drawn out of the fiber-reinforcement material by any suitable method, such as, e.g., by a vacuum. The resin material can be allowed to cure with the fiber reinforcement material.

In an embodiment of the invention, the fiber-reinforced polymer composite surrounds a marine structure, such as a piling, and defines an annular space between the between the composite and the piling. For example, the fiber-reinforced polymer composite may form an encasement or jacket that encapsulates a piling.

An encasement can be formed around the structure by any suitable method. For example, a fiber-reinforced polymer composite can be formed on an annular mold so that the composite has a shape and dimensions suitable for encasing around the structure. Illustratively, a composite can be formed on a cylindrical mold for encasing a cylindrical piling. Alternatively, a fiber-reinforced polymer composite can be formed with an opening along its length, so that it can be wrapped around a structure.

In forming the protective member around the marine structure, an annular space can be provided between the fiber-reinforcement polymer composite and the structure. The size of the annular space is not particularly limited and can depend upon, e.g., the thickness of the structure and the fiber-reinforced polymer composite as well as any desired additional strength to be imparted to the structure by the protective member.

The annular space between the fiber-reinforcement polymer composite and the marine structure can be filled with a grouting material. The grouting material can be any material that provides an interlocking between the piling and the polymer composite. The grouting material need not provide a bond between the piling and the polymer composite, although in embodiments of the invention, it may do so.

For example, the grouting material can be a cement-based underwater concrete and/or a moist-cure expanding polyurethane. In an embodiment, the grouting material can include a polyurea composition, and more particularly a one-part polyurea composition, including the one-part polyurea composition described above.

The protective member can be applied directly to new marine structures, such as pilings, or to marine structures that are already submerged in sea water. In instances where a piling is already submerged, the protective member can be applied by, for example, isolating a section of the piling to be treated from the sea water, wrapping the polymer composite around the piling, and filling the annular space with a grouting material.

In embodiments of the invention where the protective member is applied to wood pilings, the protective member can be applied to various surfaces of the piling. For example, the protective member can be applied to all surfaces of the piling exposed to water and/or air. Alternatively, the protective member can be applied to the surfaces of the piling up to, and optionally above, the high tide line mark of the piling in the marine environment. The protective member can also be applied to other surfaces of the piling not directly in contact with sea water, such as, for example, all or part of the portion of the piling that is or to be driven into the sea floor.

By use of the protective member, seawater can saturate the protected structure, such as a piling, and form a layer of stagnant water. Stagnant water is toxic to marine borers because their oxygen supply is dramatically decreased. As a result, it is expected that marine borers will be suppressed from infesting the piling. In embodiments of the invention where the piling has already been infested with marine borers, it is expected that the protective member will promote the expiration of existing marine borers, along with resisting any further degradation by new marine borers.

As alluded to above, a borer-resistant marine apparatus, such as a piling with a protective member, can not only resist degradation of the structure due to borer infestation but also can impart additional strength or structural integrity to the structure. Thus, in an embodiment of the invention, the protective member can provide additional structural integrity to a piling that has been weakened by borer infestation.

In this embodiment, the dimensions of the fiber-reinforced polymer composite, the annular space between the composite and the piling, and the grouting material are selected so as to provide additional structural integrity. For example, the thickness of the fiber-reinforced polymer composite can be selected so as to provide additional strength to the composite, and thus to the piling. Alternatively or additionally, a plurality of fiber-reinforced polymer composite layers can be combined to provide additional strength. The amount and type of grouting material can also be tailored to provide additional strength to the resulting structure. In embodiments of the invention, the protective member has sufficient strength to be driven beneath the sea floor so as to protect all points of entry of the piling by marine borers.

An embodiment of a borer-resistant marine piling apparatus utilizing a protective member may be illustrated by reference to FIGS. 1 and 2. FIG. 1 is a side cross-section view of a submerged wood piling apparatus 10 illustrating a protective member. The piling 10 is driven into the bottom of the sea floor 20 and extends above the high tide mark 12 of the sea water 14. A protective member 16 surrounds the piling 10 from below the sea floor 20 to above the high tide line 12.

The positioning of the protective member 16 around piling 10 allows a layer of stagnant water 18 to form about the piling. The stagnant water layer is believed to deplete the oxygen level available to marine borers and hence resist degradation of the piling due to infestation of such marine borers.

Figure 2:
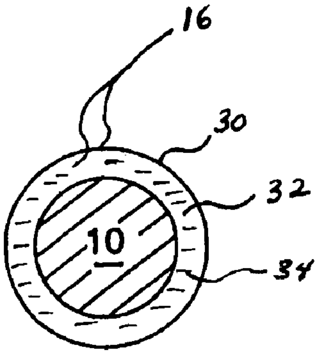
FIG. 2 is a top cross-section view of a submerged wood piling apparatus of FIG. 1, further illustrating the protective member.

FIG. 2 is a top cross-section view of a submerged wood piling apparatus of FIG. 1, further illustrating protective member 16 surrounding the piling 10. Protective member 16 comprises a fiber-reinforced polymer composite 30 which surrounds the piling, defining an annular space 32 between composite 30 and piling 10. Annular space 32 is filled with a grouting material 34. By use of a wood piling apparatus as illustrated by FIGS. 1 and 2 and as described above, the degradation of wood pilings due to borer infestation can be suppressed.

EXAMPLES

The following examples are provided to further illustrate the present invention. It is to be understood, however, that these examples are for purposes of illustration only and are not intended as a definition of the limits of the invention.

Example 1

A one-part polyurea composition was prepared by the following method and tested for its ability to suppress termite infestation of wood. The polyurea composition contained 628.5 g of polyaldimine, 176.5 g of an aromatic diisocyanate, and 10 g of benzoic acid, as described below.

A polyaldimine of the following formula

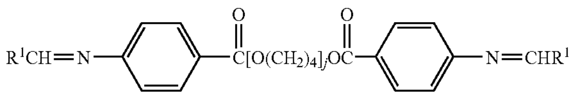

where $R^1$ is 4-methoxyphenyl and j ranges from 12 to 16 was prepared in accordance with the teaching of U.S. Pat. No. 6,552,155. Specifically, Versalink P-1000 (Air Products Corp.) was heated with an excess of 4-anisaldehyde in the presence of toluene and benzoic acid. The water generated in the reaction was removed, and the toluene was stripped from the resulting composition.

The polyaldimine and benzoic acid, and carbodiimide modified diphenyl diisocyanate Isonate 143 L (Dow Chemical Company) were heated separately to about 45° C. and then mixed with high velocity stirring. The resulting polyurea was put into a sealed storage bottle.

The one-part polyurea composition was brushed onto exposed surfaces of a piece of wood of dimensions approximately two by four feet and allowed to cure. The treated wood was placed in a termite hill, along with a piece of wood of the same type and approximate size painted with black oil-based paint. After nine months, the untreated, painted wood and the wood with the one-part polyurea composition applied thereto were removed from the termite hill and examined.

Figure 3A:
FIGS. 3A-3C are photographs of a piece of wood treated with a one-part polyurea composition and an untreated, painted piece of wood exposed to a termite hill for 9 months, in accordance with Example 1.
Figure 3B:
Figure 3C:
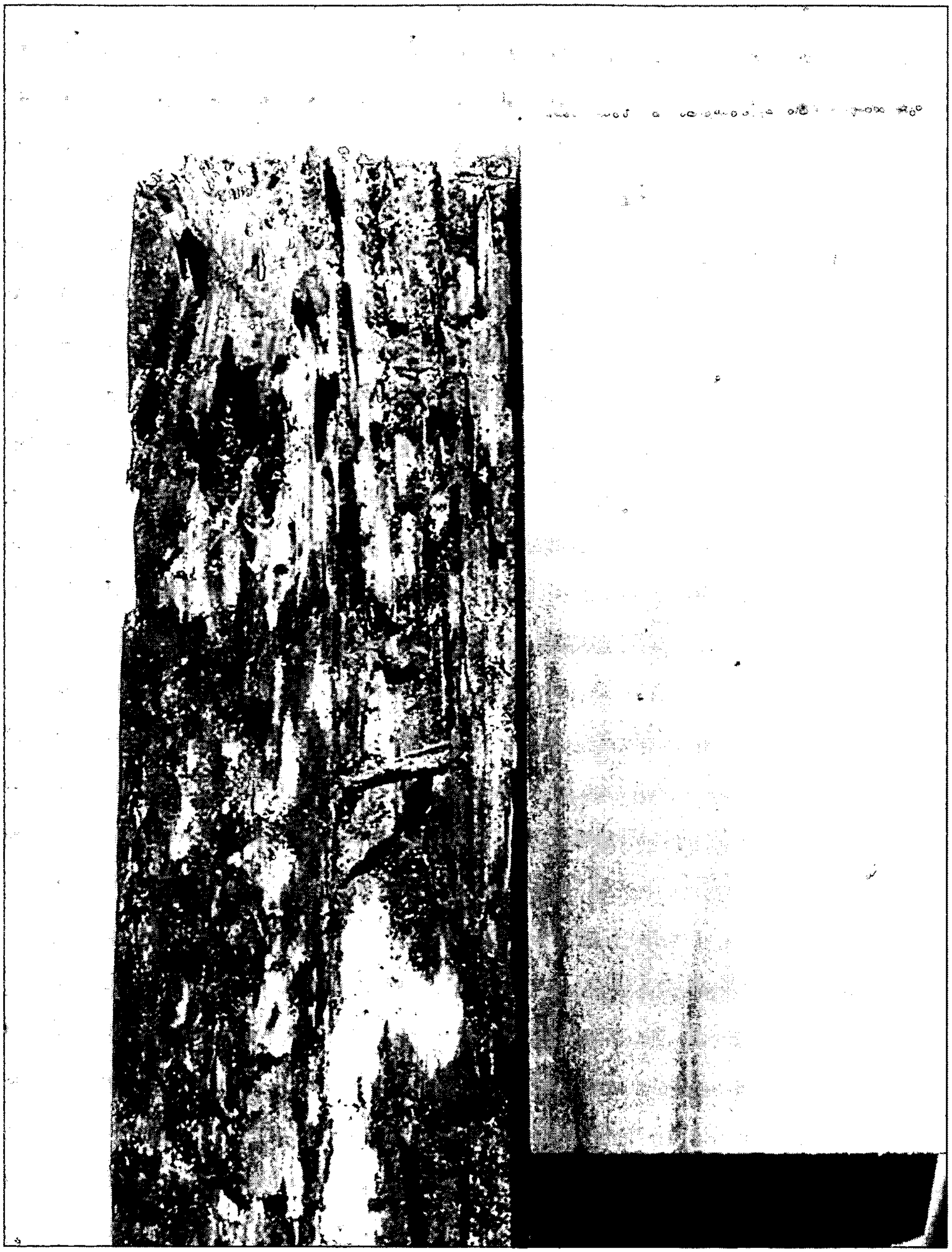

FIGS. 3A, 3B, and 3C are photographs of different views of the piece of wood treated with the polyurea composition and the untreated wood. As can be seen from the photographs, the untreated piece of wood sustained considerable damage due to termite infestation. In contrast, the wood coated with the one-part polyurea composition sustained no termite damage.

Example 2

The one-part polyurea formulation described Example 1 was sprayed on a cedar railing having active borer bee infestation so as to leave a film over all exposed surfaces of the railing. Four days after application of the polyurea application, based on a visual inspection of the railing, all active borer infestation appeared to have been extinguished. No additional or new borer bee presence was spotted for six months since the application of the polyurea formulation.

It will be apparent to those skilled in the relevant art that the disclosed invention may be modified in numerous ways and may assume embodiments other than the preferred form specifically set out and described above. Accordingly, it is intended by the appended claims to cover all modifications of the invention which fall within the true spirit and scope of the invention.

What is claimed is:

1. A method of suppressing degradation of wood, wood products, or wooden structures by borer infestation, comprising applying a one-part polyurea composition to said wood, wood product, or wooden structure in an amount effective to suppress degradation of the wood, wood product, or wooden structure by a wood borer, wherein the one-part polyurea composition comprises:

(a) one or more compounds having Formula I:

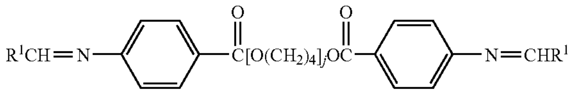

wherein j is an integer of 3 to 30 and $R^1$ is an unsubstituted homocyclic or heterocyclic aryl radical or alkyl, alkoxy, alkylthio or halogen substituted homocyclic or heterocyclic aryl radical;

(b) an aromatic polyisocyanate, a polyurethane/urea prepolymer having aromatic isocyanate groups, or a combination thereof; and (c) a protic acid or a salt thereof, and wherein the one-part polyurea composition is applied to said wood, wood product, or wooden structure in an amount effective to suppress degradation by at least one of termites, carpenter ants, and wood-boring bees.

2. A method of suppressing degradation of wood, wood products, or wooden structures by borer infestation, comprising applying a one-part polyurea composition to said wood, wood product, or wooden structure in an amount effective to suppress degradation of the wood, wood product, or wooden structure by a wood borer, wherein the one-part polyurea composition comprises:

(a) one or more compounds having Formula I:

I

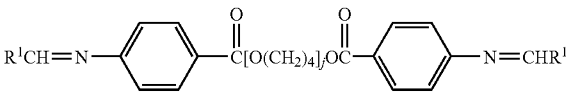

wherein j is an integer of 3 to 30 and $R^1$ is an unsubstituted homocyclic or heterocyclic aryl radical or alkyl, alkoxy, alkylthio or halogen substituted homocyclic or heterocyclic aryl radical;

(b) an aromatic polyisocyanate, a polyurethane/urea prepolymer having aromatic isocyanate groups, or a combination thereof; and (c) a protic acid or a salt thereof, wherein the one-part polyurea composition is applied to a wood marine piling in an amount effective to suppress degradation of the piling by infestation from shipworms, and wherein applying the one-part polyurea composition to the marine piling comprises contacting the marine piling with a fabric and applying the one-part polyurea composition to the fabric.

3. The method of claim 2, wherein applying the one-part polyurea composition to the fabric comprises brushing, spraying, or soaking the fabric with the one-part polyurea composition.

4. The method of claim 3, wherein the one-part polyurea composition is bonded to the fabric and to the piling.

5. A method of suppressing degradation of a wood marine piling by borer infestation comprising forming a protective member around the piling which suppresses degradation of the piling by borer infestation;

wherein the protective member comprises a fiber-reinforced polymer composite surrounding the piling, defining an annular space between the composite and the piling, and a grouting material in the annular space and wherein the composite of the protective member comprises a fiber-reinforcement material and a resin material including a one-part polyurea composition in an amount effective to suppress degradation of the wood marine piling, comprising:

(a) a compound or mixture of compounds having Formula I:

I

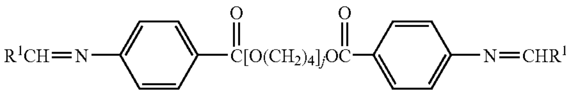

wherein j is an integer of 3 to 30 and $R^1$ is unsubstituted homocyclic or heterocyclic aryl radical or alkyl, alkoxy, alkylthio or halogen substituted homocyclic or heterocyclic aryl radical;

(b) an aromatic polyisocyanate and/or a polyurethane/urea prepolymer having aromatic isocyanate groups; and (c) a protic acid or salts thereof.

6. The method of claim 5, wherein forming the protective member around the piling comprises surrounding the piling with the fiber-reinforced polymer composite and adding the grouting material to the annular space.

* * * * *